(12) United States Patent
Lund et al.

(10) Patent No.: US 7,852,785 B2
(45) Date of Patent: Dec. 14, 2010

(54) SAMPLING AND ANALYZING PACKETS IN A NETWORK

(75) Inventors: Carsten Lund, Berkeley Heights, NJ (US); Edith Cohen, Berkeley Heights, NJ (US); Nicholas Duffield, Summit, NJ (US); Alexandre Gerber, Madison, NJ (US); Adam Hersh, Highland Park, IL (US); Oliver Spatscheck, Randolph, NJ (US); Mikkel Thorup, Florence, MA (US); Frederick True, Bloomsbury, NJ (US)

(73) Assignee: AT&T Intellectual Property I, L.P., Austin, TX (US)

( * ) Notice: Subject to any disclaimer, the term of this patent is extended or adjusted under 35 U.S.C. 154(b) by 290 days.

(21) Appl. No.: 12/119,939

(22) Filed: May 13, 2008

(65) Prior Publication Data

US 2009/0316590 A1 Dec. 24, 2009

(51) Int. Cl.
 *G01R 31/08* (2006.01)
(52) U.S. Cl. .................. 370/252; 709/224
(58) Field of Classification Search ......... 370/252, 370/241, 229, 235, 389; 709/224
See application file for complete search history.

(56) References Cited

U.S. PATENT DOCUMENTS

| 5,315,580 | A | 5/1994 | Phaal | |
|---|---|---|---|---|
| 6,434,116 | B1 * | 8/2002 | Ott | 370/235 |
| 6,473,400 | B1 * | 10/2002 | Manning | 370/229 |
| 6,920,112 | B1 | 7/2005 | McCloghrie et al. | |
| 7,165,100 | B2 | 1/2007 | Cranor et al. | |
| 7,193,968 | B1 * | 3/2007 | Kapoor et al. | 370/235 |
| 7,215,637 | B1 | 5/2007 | Ferguson et al. | |
| 7,420,929 | B1 * | 9/2008 | Mackie | 370/252 |
| 2003/0055950 | A1 | 3/2003 | Cranor et al. | |
| 2003/0187977 | A1 | 10/2003 | Cranor et al. | |
| 2005/0190695 | A1 * | 9/2005 | Phaal | 370/229 |
| 2005/0270985 | A1 * | 12/2005 | Hao et al. | 370/252 |
| 2005/0276230 | A1 * | 12/2005 | Akahane et al. | 370/252 |
| 2006/0190602 | A1 | 8/2006 | Canali et al. | |
| 2006/0239219 | A1 | 10/2006 | Haffner et al. | |
| 2006/0291473 | A1 | 12/2006 | Chase et al. | |
| 2007/0027984 | A1 * | 2/2007 | Jorgensen et al. | 709/224 |
| 2007/0226239 | A1 | 9/2007 | Johnson et al. | |
| 2007/0271374 | A1 * | 11/2007 | Shomura et al. | 709/224 |
| 2007/0286085 | A1 * | 12/2007 | Rabinovitch | 370/241 |
| 2009/0116398 | A1 * | 5/2009 | Shi et al. | 370/252 |

* cited by examiner

*Primary Examiner*—Aung S Moe
*Assistant Examiner*—Vinncelas Louis
(74) *Attorney, Agent, or Firm*—Hoffmann & Baron, LLP

(57) ABSTRACT

The preferred embodiments of the present invention can include sampling packets transmitted over a network based on the content of the packets. If a packet is sampled, the sampling unit can add one or more fields to the sampled packet that can include a field for a number of bytes contained in the packet, a packet count, a flow count, a sampling type, and the like. The sampled packets can be analyzed to discern desired information from the packets. The additional fields that are added to the sampled packets can be used during the analysis.

20 Claims, 5 Drawing Sheets

SAMPLING AND ANALYZING PACKETS IN A NETWORK

BACKGROUND

1. Field of the Invention

The present invention is related to sampling and analyzing packets in a network.

2. Brief Discussion of Related Art

Packet sampling is commonly employed in networks to sample network traffic for subsequent analysis of the packets. For example, packets may be sampled corresponding to a specific destination Internet protocol (IP) address to determine how many packets were sent to the IP address in a given period.

One conventional sampling approach that can be implemented samples every $N^{th}$ packet (e.g., every $100^{th}$ packet in the network traffic) without regard to the information contained by the packet. The sampling rate for this can be configurable so that more or fewer packets are sampled. Such random selection of packets to sample can be used to manage available hardware resources that are used for sampling, and later analyzing, the packets. However, this random approach may not provide a sufficient number of packets of interest to perform an accurate analysis of the network traffic represented by the sampled packets. For example, a user may be interested in content of the packets being sent between a source IP address and a destination IP address, where the packets originate at the source IP address and terminate at the destination IP address, or in all packets associated with a flow. Since only every $N^{th}$ packet is sampled, there are packets between the source and destination IP addresses or within a flow that may not be sampled, which results in the inability to perform the desired analysis.

Another conventional sampling approach can sample all of the packets or none of the packets based on the packet's flow key. In this conventional sampling approach, all packets that match a predetermined flow key are sampled and packets that do not match the predetermined flow key are not. As a result of this sampling scheme, an analysis can be performed for a given flow, but information from other flows is unavailable to perform other analysis. As a result, if the same flow key is associated with many different flows, for example, having a few malicious packets per day, information about this traffic will likely go undetected.

SUMMARY OF THE INVENTION

The preferred embodiments of the present invention include a method, medium, and system to facilitate the analysis of packets transmitted over a network. The preferred embodiments can determine whether to sample a packet from network traffic based on content of the packet and add a field to the packet in response to the packet being sampled. The field includes information concerning the content of the packet. The added field can be based on a number of bytes in the packet, to identify the packet as being from a flow that has not been sampled, and/or to identify a type of sampling that was used to sample the packet. An analysis of the sampled packet can be achieved by summing the information from the field with corresponding fields of other packets that have been sampled. The resources used to analyze sampled packets can be maintained substantially constant despite an increase in an amount of packets that are sampled.

To determine whether to sample a packet, a flow key for the packet can be identified and a determination can be made as to whether the flow key is associated with a list of flows from which packets should be sampled. The packet is sampled in response to the flow key being on the list. Alternatively, or in addition, it can be determined whether the flow key is associated with an actively sample flow and the packet can be sampled when the flow key is associated with an actively sampled flow. The packet can be associated with the flow and a determination as to whether to sample the packet can be made without regard to an earlier decision to sample one or more flows.

In some embodiments, a determination as to whether to sample the packet is made based on a probability of sampling a flow or a packet. In one example, the determination to sample a packet can be made when a number of sampled flows is less than a product of a number of total flows multiplied by a probability of sampling a flow. In another example, the determination to sample the packet can be made when a number of sampled packets is less than a product of a number of total packets multiplied by a probability of sampling a packet. In other examples, the determination to sample the packet can be made using a comparison between a pseudo randomly generated number and the probability of sampling a flow or a packet.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

The preferred embodiments of the present invention can include a sampling unit and an analysis unit. The sampling unit preferably samples packets transmitted over a communications network based on a given criteria and the content of the packets. Content of a packet includes information contained within, for example, a header section, payload data section, or other field of the packet, where a field is a section of information in a packet generally in the form of binary values. Sampling refers to a process of identifying a packet to be used for further analysis. The actual packet or a duplicate of the packet can be used for analysis. Duplicating the packet allows the original packet to reach its destination, while the sampled packet can be sent to an analysis unit. If a packet is sampled, the sampling unit can add one or more fields to the sampled packet that can include a field for a number of bytes contained in the packet, a packet count, a flow count, a sampling type, and the like. The analysis unit can receive those packets that are sampled and analyze the sampled packets to discern desired information from the packets, such as a number of bytes, packets, and/or flows being transmitted over the network, or to determine the nature of the communications between terminal devices. The analysis unit can use the additional fields that are added to the sampled packets during the analysis.

Figure 1:
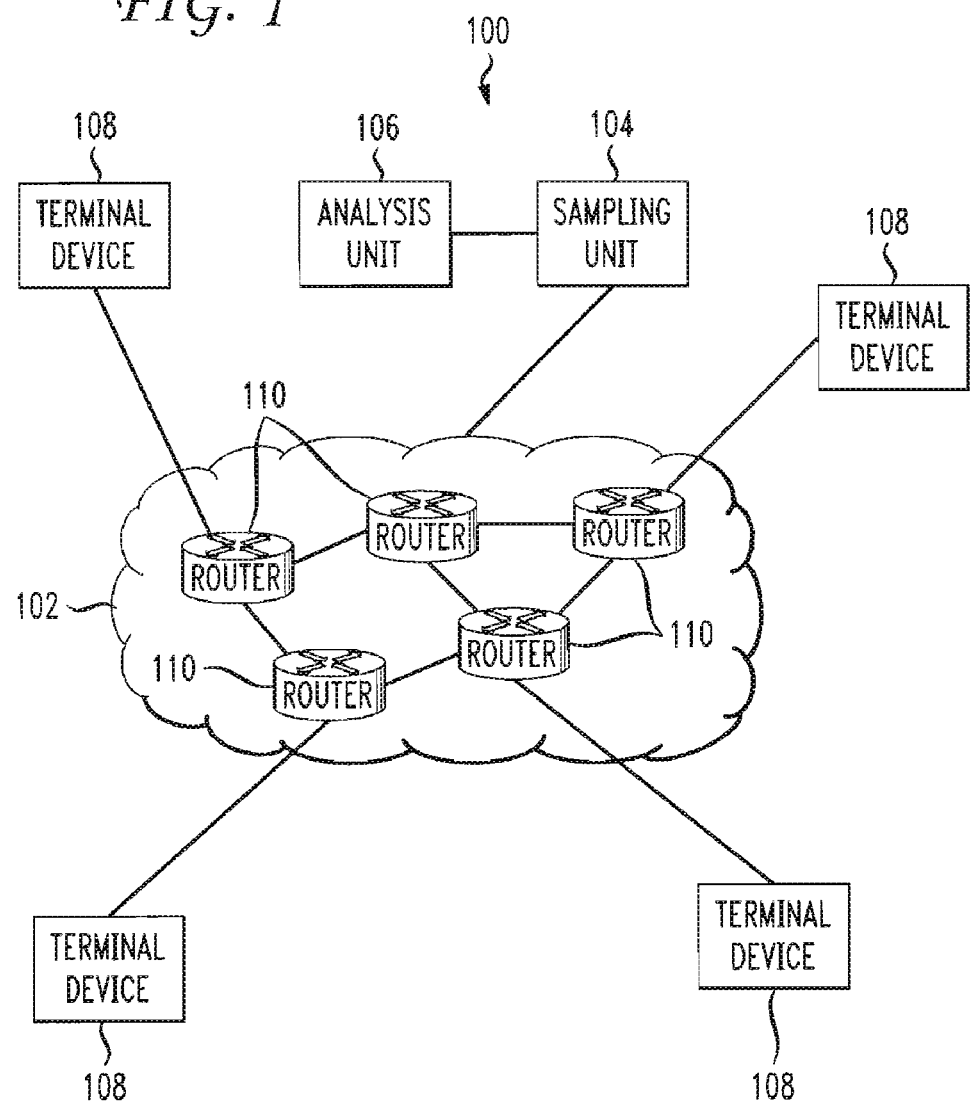
FIG. 1 is a block diagram of a system for sampling and analyzing packets being sent over a communications network in accordance with the preferred embodiments of the present invention.

FIG. 1 is a block diagram of a system 100 for sampling and analyzing packets being sent over a communications network 102 (hereinafter "network 102") in accordance with the preferred embodiments of the present invention. The system 100 can include the network 102, a sampling unit 104, an analysis unit 106, and terminal devices 108. The sampling unit 104 and the analysis unit 106 are preferably communicatively coupled so that packets sampled by the sampling unit can be passed to the analysis unit 106 for processing. The sampling unit can be coupled to the network 102 to sample packets that are transmitted over the network 102.

Terminal devices 108 can be coupled to the network 102 and can use the network 102 to send packets of information to each other. The terminal device can be, for example, a mainframe, personal computer (PC), laptop computer, workstation, handheld device, such as a PDA or smart phone, or the like. Each connection point to the network 102 used by the terminal devices 108 to couple to the network 102 can have an associated Internet Protocol (IP) address that is unique to the connection point. The network can include network nodes 110, such as routers that route the packets to destination IP addresses from source IP addresses.

To access the packets being transmitted over the network 102, the sampling unit can tap into one or more of the lines between the network nodes and/or the terminal devices 108. For example, in some embodiments, one of the lines can be an optical cable and the sampling unit 104 can be coupled to the optical cable via another optical cable. In other embodiments, the sampling unit 104 and/or analysis unit 106 can be implemented in one or more of the network nodes 110 or can be in communication with one or more of the network nodes 110.

Figure 2:
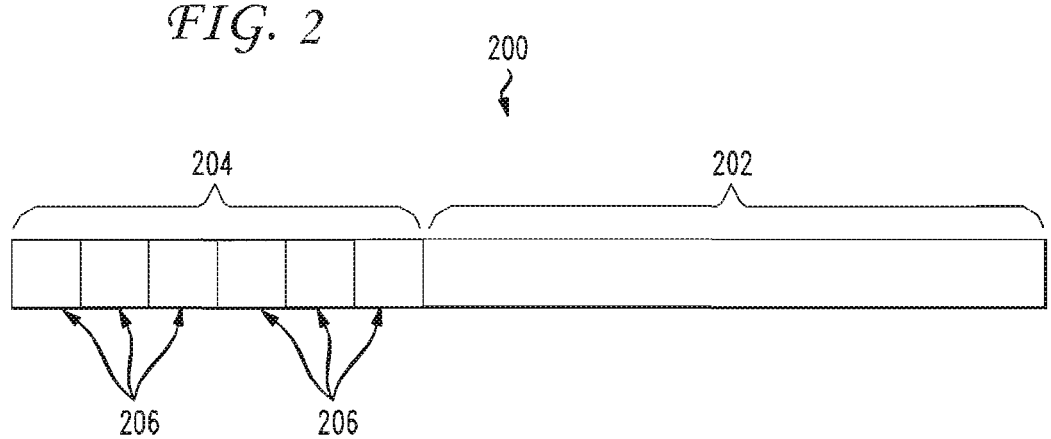
FIG. 2 shows an exemplary packet that can be sent over a communications network

FIG. 2 shows the content of an exemplary packet 200 that can be transmitted over the network. The packet can include a data section 202 and a header 204. The data section 202 can include information that one of the terminal devices (source) wishes to convey to one or more other terminal devices (destination). The header 204 can include information used during the routing of the packet. For example, the header 204 can include fields 206 for a source IP address, a destination IP address, a source port number, a destination port number, IP protocol, and the like.

Figure 3:
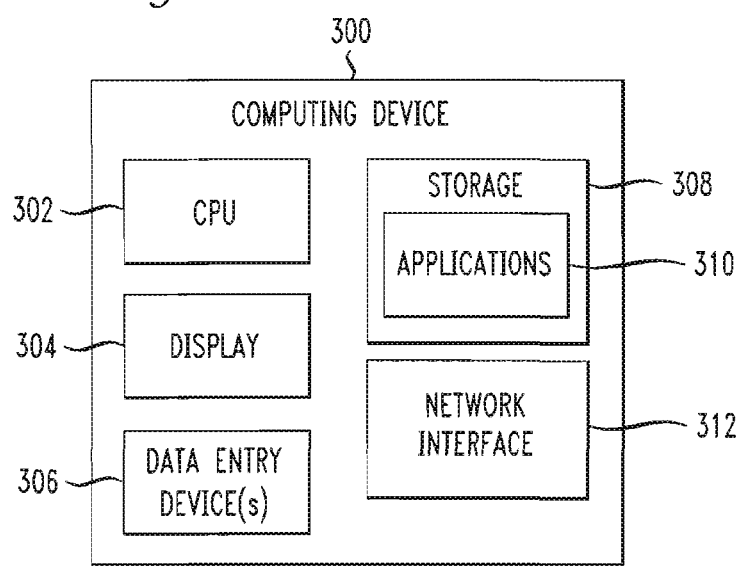
FIG. 3 is a block diagram of a computing device for performing the sampling and/or the analysis of the sampled packets.

FIG. 3 shows a block diagram of a computing device 300 that can be used to implement the sampling unit 104 and/or the analysis unit 106. The computing device 300 can be a mainframe, personal computer (PC), laptop computer, workstation, handheld device, such as a PDA or smart phone, or the like. In the illustrated embodiment, the computing device 300 includes a central processing unit (CPU) 302 and preferably a display device 304. The display device 304 enables the computing device 300 to communicate directly with an operator through a visual display. The computing device 300 can further include data entry device(s) 306, such as a keyboard, touch screen, and/or mouse. The computing device 300 can include storage 308 for storing data and instructions. The storage 308 can include such technologies as a floppy drive, hard drive, tape drive, Flash drive, optical drive, read only memory (ROM), random access memory (RAM), and the like.

Applications, such as applications 310 for implementing the sampling unit and/or the analysis unit for sampling and analyzing packets transmitted over the network 100 can be resident in the storage 308. The applications 310 can include instructions for implementing those embodiments described herein. The storage 308 can be local or remote to the computing device 300. The computing device 300 includes a network interface 312 for communicating with the network 100. The CPU 302 operates to run the applications 310 in storage 308 by performing instructions therein and storing data that results from the performed instructions, which may be presented to an operator via the display 304 or by other mechanisms known to those skilled in the art, such a print out from a printer. The data can include packets that are sampled as well as an analysis of the packets that are sampled.

In some embodiments, the sampling unit and the analysis unit can be implemented in the same computing device. In other embodiments, the sampling unit and the analysis unit can be implemented by separate computing devices. Additionally, the analysis unit may have no knowledge of the sampling used by the sampling unit, but may use fields that are added to sampled packets when performing an analysis.

Figure 4:
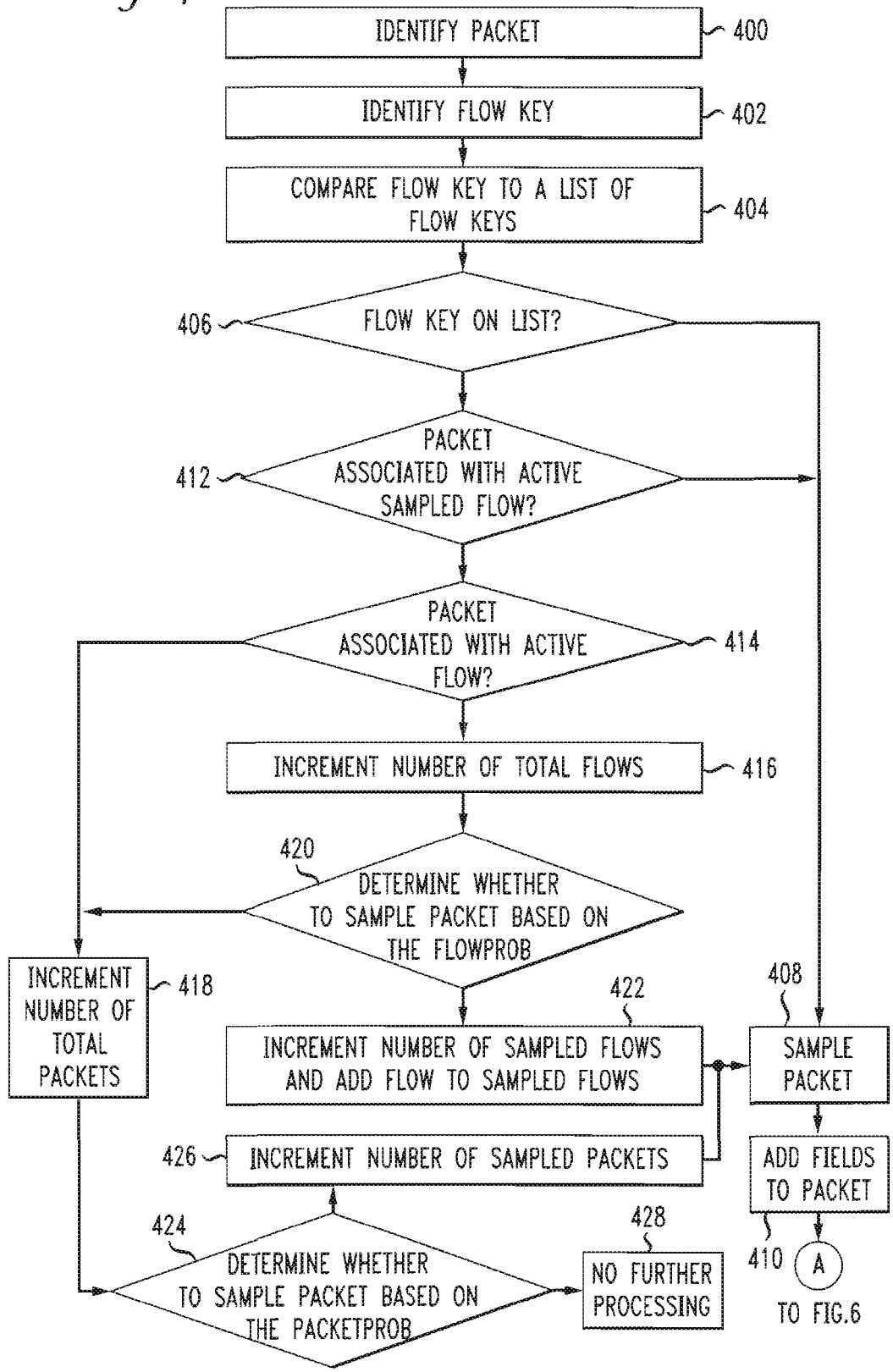
FIG. 4 is a flowchart illustrating a first stage sampling of packets being sent over a communications network.

FIG. 4 is a flowchart showing a preferred embodiment of the sampling performed by the sampling unit. To begin, a packet being transmitted over the network is identified by the sampling unit (step 400). The flow key of the packet is identified for use in an initial determination of whether to sample the packet (step 402). A flow key, as used herein, refers to a concatenation of fields in the header of the packet. For example, a flow key can consist of a source IP address, a destination IP address, protocol, port numbers, and the like. The flow key of the packet is compared with a list of flow keys that designates flows of interest for which packets should be sampled (step 404). If the flow key of the packet is associated with the list of flow keys (step 406), the packet is sampled (step 408) and the sampling unit adds fields to the packet, for example, in the packet header (step 410). The fields added to the packet header can include, for example, a field for a number of bytes in the packet, a field having a value to be used by the analysis unit when analyzing a number of packets sampled, a field having a value to be used by the analysis unit when analyzing a number of flows sampled, and a field indicating the type of sampling used to sample the packet.

In one example, when a packet is sampled because it has a flow key that is associated with a listed flow key, a "Corrected Bytes" field can be added to the packet that identifies the number of bytes in the packet, a "Corrected Packets" field can be added that includes a binary one, and a "Corrected Flows" field can be added that includes a binary one.

If the flow key of the packet is not associated with the list of flow keys (step 406), the sampling unit determines whether packet is associated with an active sampled flow (step 412). As used herein, the term "flow" refers to packets that have the same flow key and that are sent within a predetermined time of each other. As used herein, "active sampled flow" refers to a flow from which packets are being sampled. If the packet is associated with an active sampled flow (step 412), the packet is sampled (step 408) and the sampling unit adds fields to the packet header that can include, for example, a field for a number of bytes in the packets, a field having a value to be used by the analysis unit when analyzing a number of packets sampled, a field having a value to be used by the analysis unit when analyzing a number of flows sampled, such as a probability of sampling a particular flow, and a field indicating the type of sampling used to sample the packet (step 410).

When the flow key of the packet is not associated with an active sampled flow (step 412), the sampling unit determines whether the flow key of the packet is associated with an active flow (step 414). As used herein, the term "active flow" refers to a flow from which packets have already been encountered by the sampling unit, but from which packets have not been sampled. If the packet is not associated with an active flow (step 414), the sampling unit increments a total number of flows it has observed (step 416). If the packet is associated with an active flow (step 414), the sampling unit increments a total number of packets it has observed from the flow associated with the packet (step 418).

When the packet does not belong to an active flow, the sampling unit preferably determines whether to sample the packet based on a probability of sampling a flow (FLOWPROB) (step 420). For example, if a number of sampled flows is less than the total number of flows multiplied by a probability of sampling the flow (FLOWPROB) the packet is sampled. Alternatively, a pseudo-random number can be generated for the packet and if the pseudo random number is an the total number of flows multiplied by a probability of sampling the flow (FLOWPROB), then the packet is sampled. If the packet is sampled (step 420), the sampling unit increments a number of sampled flows and includes the flow with flows that have been sampled (step 422) and the packet is sampled (step 408). The sampling unit also adds fields to the packet header, such as, for example, a field for a number of bytes in the packets, a field having a value to be used by the analysis unit when analyzing a number of packets sampled, a field having a value to be used by the analysis unit when analyzing a number of flows sampled, such as a probability of sampling a particular flow, and a field indicating the type of sampling used to sample the packet (step 410).

In one example, when a packet is sampled as a result of step 412 or 420, a "Corrected Bytes" field can be added to the packet that identifies the number of bytes in the packet, a "Corrected Packets" field can be added that includes a binary one, and a "Corrected Flows" field can be added that includes a quotient of one divided by the probability of sampling a flow (FLOWPROB).

When the packet does belong to an active flow (step 414) or when it is determined not to sample the packet based on the probability of sampling a flow (step 420), the sampling unit increments a number of total packets (step 418) and determines whether to sample the packet based on a fraction of packets to be sampled (PACKET PROB) (step 424). For example, if a number of sampled packets is less than the total number of packets multiplied by a fraction of packets to be sampled (PACKETPROB), then the packet is sampled. Alternatively, a pseudo-random number can be generated for the packet and if the pseudo random number is less than the total number of packets multiplied by a fraction of packets to be sampled (PACKETPROB), then the packet is sampled. If the packet is sampled (step 424), the sampling unit updates the number of sampled packets (step 426) and the packet is sampled (step 408). The sampling unit also adds fields to the packet header that can include, a field with a value equal to a number bytes in the packet divided by the fraction of packets to be sampled, a field with a value equal to one divided by the fraction of packets to be sampled, a field having a value to be used by the analysis unit when analyzing a number of flows sampled. If the packet is not sampled (step 424), no analysis is performed on the packet (step 428). Packets that are sampled by the sampling unit are sent to the analysis unit for further processing.

In one example, when a packet is sampled as a result of step 424, a "Corrected Bytes" field can be added that includes a quotient of the number of bytes in the packet divided by the fraction of packets to be sampled (PACKETPROB), a "Corrected Packets" field can be added that includes a quotient of one divided by the fraction of packets to be sampled (PACKETFRAC), and a "Corrected Flows" field can be added that includes a zero.

Figure 5:
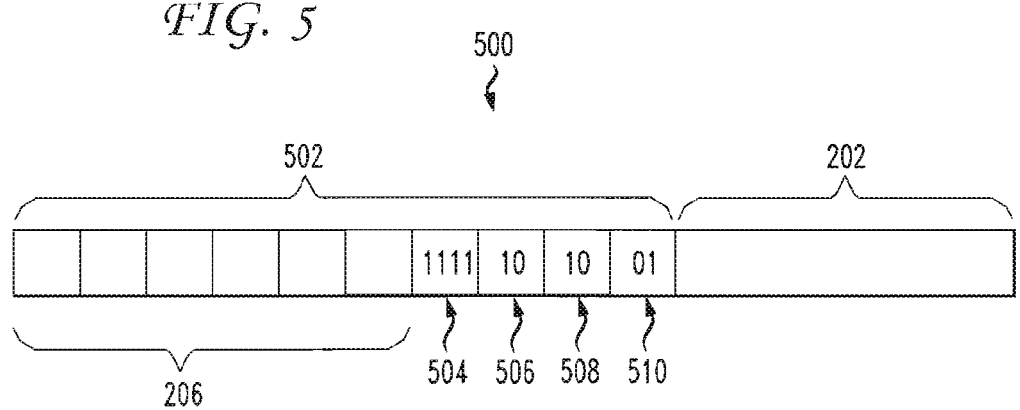
FIG. 5 shows an exemplary packet that has been sampled in accordance with the preferred embodiments.

FIG. 5 is an exemplary packet 500 that has been sampled by the sampling unit. The sampled packet 500 includes the data section 202 and a header 502. The header 502 can include information used during the routing of the packet. For example, the header 502 can include fields 206 for a source IP address, a destination IP address, a source port number, a destination port number, IP protocol, and the like. Additionally, the header 502 can include additional fields 504, 506, 508, and 510 added by the sampling unit when the packet was sampled. Field 504 represents a number of corrected bytes contained in the sampled packet 500, which in this example is 16 bytes. As an example, if a packet having eight bytes was sampled as a result of step 424, where PACKETPROB=0.5, the corrected bytes field 504 can be include the value of 16. Field 506 has a value of binary 2, which can be used by the analysis unit to tally the number of correct packets sampled by the sampling unit. Field 508 has a value of binary 2, which can be used by the analysis unit to tally the number of flows sampled by the sampling unit. Field 510 represents a sample type used by the sampling unit to sample the packet. For example, different values in field 510 can correspond to different sampling types. As described herein, sampling types can include sampling based on fraction of packets, a probability of flow, a list of flow keys, and active sampled flows, although those skilled in the art will recognize that other sampling types can be implemented in accordance with the preferred embodiments. In this example, the value of field 510 is a binary 1, which indicates that the packet was sampled because it was associated with a flow key in the list of flow keys.

Figure 6:
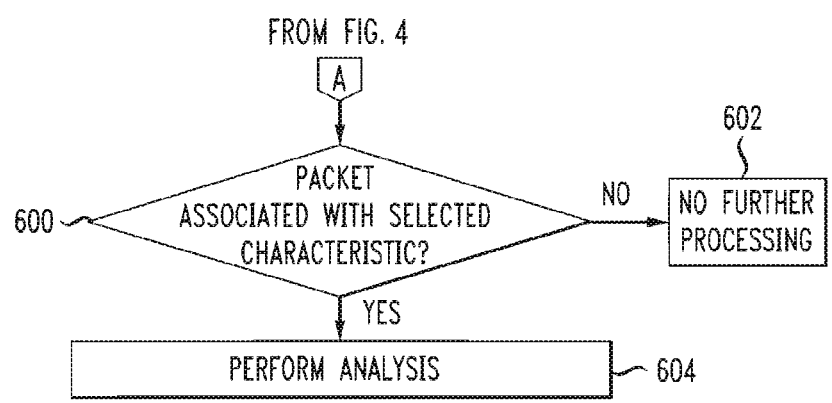
FIG. 6 is a flowchart illustrating a second stage analysis of packets sampled by a sampling stage.

FIG. 6 is a flow chart showing a preferred embodiment of the analysis performed by the analysis unit. Once the analysis unit receives the sampled packet from the sampling unit, the analysis unit determines whether the packet contains information associated with selected characteristic, such as an IP address, a port number, a number bytes, a sampling type, IP protocol, and the like (step 600). In the present example, the selected characteristic is the destination IP address. If the sampled packet is not associated with the selected characteristic (step 600), no further processing is performed by the analysis unit (step 602). If the packet contains information associated with the selected characteristic (e.g., a destination address that matches the selected destination address) (step 600), the analysis unit can perform further analysis on the content of the packets (step 604).

Figure 7:
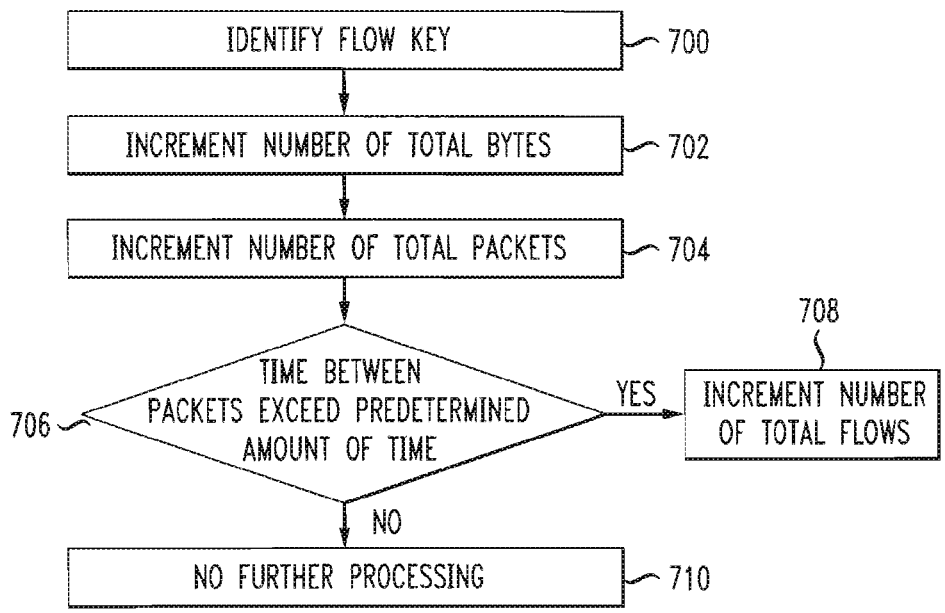
FIG. 7 is a flowchart illustrating an exemplary analysis that can be performed in accordance with the preferred embodiments.

FIG. 7 shows one embodiment of the further analysis that can be performed by the analysis unit. In this embodiment, the analysis unit determines a number of bytes, packets, and flows that are sampled which are associated with sampled packets having the selected characteristic. The analysis unit can identify the flow key of the sampled packet (step 700). In some embodiments, the analysis unit can use the flow key that was previously identified by the sampling unit. In other embodiments, the analysis unit may not require the flow key to perform an analysis, such as when the analysis unit does not determine a total number of flows that are sampled or a total number of packets in a given sampled flow.

After the flow key is identified, the analysis unit can increment a total number of bytes contained in sampled packets having the selected characteristic based on a value in one of the fields that was added (e.g., correct bytes field 504) to the sampled packet by the sampling unit as an additional field (step 702). In this manner, the analysis unit can keep track of the total number of bytes that are, for example, being sent to a selected destination IP address. This provides an unbiased estimator for the packets processed by the sampling unit, whether sampled or not. In addition, the analysis unit can increment a total number of packets sampled that are associated with the selected characteristic using one of the fields added to the sampled packet by the sampling unit (step 704). The total number of packets can be used to track the number of packets that are, for example, being sent to a selected destination address.

The analysis unit can also track the total number flows that are, for example, being sent to the destination IP address. To establish the total number of flows, the analysis unit determines whether a predetermined amount of time has passed between packets having the same flow key. If the time between packets with the same flow key is greater than the predetermined amount of time (step 706), the total number of flows can be incremented to represent the addition of a new flow (step 708). If the predetermined amount of time is not exceeded (step 706), no further processing is performed (step 710).

In some embodiments, the analysis unit can be implemented as part of a packet sniffer whose implementation is known to those skilled in the art. The analysis unit can be used to analyze the content of the packets to determine the nature of the communications between terminal devices.

In other embodiments, the sampling unit and/or analysis unit can be implemented as part of a high speed application-level monitor that can coordinated and scheduled as an intelligent (load sensitive) cluster, which can be harnessed for applications such as network-security monitoring. On such application in which the sampling unit and/or analysis unit can be implemented is the Gigascope from AT&T, which can automatically create application classifiers from sample traces, solve the problem of tracking applications that use dynamic ports, measure performance of ISPs serving customer VPN users, extract accurate TCP performance measurements, despite IPSec encryption, and cluster unknown applications to known applications (telnet, p2p, ftp, dns) with matching behavior.

Figure 8:
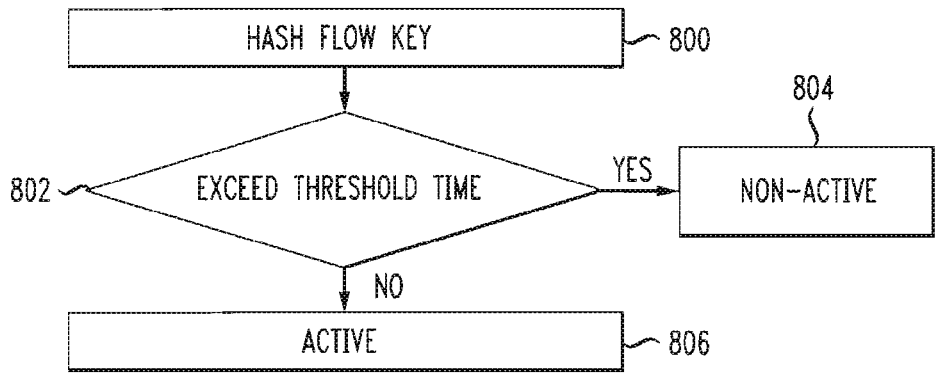
FIG. 8 is a flow chart illustrating one embodiment for determining whether a flow is active.

FIG. 8 shows one embodiment for determining whether a flow is an active sampled flow (step 412 of FIG. 4) and/or an active flow (step 414 of FIG. 4). The flow key that is identified for the packet is hashed (step 800). As used herein, hashing refers to mapping the field values of the flow key into a smaller domain using techniques known to those skilled in the art. The mapping can generate flow key hash values, which can be stored in a hash table. The hash values and the hash table preferably keep information about when a packet with a particular flow key was last identified. The analysis unit can retrieve information from the hash table to determine the amount of time between packets having the same flow key. If the amount of time between sampled packets with the same flow key exceeds a threshold time (step 802), the sampled packet to be analyzed is consider to be from a non-active flow or a non-active sampled flow (step 804). Otherwise, the sampled packet to be analyzed is considered to be from an active flow or an active sampled flow (step 806).

The preferred embodiments advantageously include a flexible sampling scheme that can perform sampling based on a multitude of factors. As described herein, packet sampling can occur based on a number of packets desired to be sampled, a number of flows to be sample, the flow key of the packets, and the like. This approach provides an approach to sampling network traffic that efficiently utilizes resources of the sampling unit and analysis unit. In the preferred embodiments, described herein, the analysis unit can operate independent of the data transfer rate of the network from which the packets are being sampled. The preferred embodiments can advantageously manage the volume of data analyzed by the analysis unit and can decrease the amount of storage required. The preferred embodiments can achieve these advantages while having the ability to sample complete flows, where the decision to sample a flow does not depend directly on earlier decisions to sample flows.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

The invention claimed is:

1. A method of analyzing packets transmitted over a communications network comprising:
   determining whether to sample a packet from network traffic based on content of the packet and based on whether a number of sampled flows is less than a product of a number of total flows multiplied by a probability of sampling a flow;
   sampling the packet when the number of sampled flows is less than the product of the number of total flows multiplied by the probability of sampling a flow; and
   adding a field to the packet in response to the packet being sampled, the field including information concerning the content of the packet.

2. The method of claim 1, wherein determining whether to sample the packet comprises:
   identifying a flow key for the packet;
   determining whether the flow key is associated with a list of flows from which packets should be sampled; and
   sampling the packet in response to the flow key being on the list.

3. The method of claim 1, wherein determining whether to sample the packet comprises:
   identifying a flow key for the packet;
   determining whether the flow key is associated with an actively sample flow; and
   sampling the packet when the flow key is associated with an actively sampled flow.

4. The method of claim 1, further comprising:
   determining whether to sample the packet based on whether a number of sampled packets is less than a product of a number of total packets multiplied by a probability of sampling a packet; and
   sampling the packet when the number of sampled packets is less than the product of a number of total packets multiplied by the probability of sampling a packet.

5. The method of claim 1, further comprising:
   generating a pseudo random number;
   associating the pseudo random with the packet; and
   determining whether to sample the packet based on a comparison between the pseudo random number and at least one of a probability of sampling a packet or a probability of sampling a flow.

6. The method of claim 1, wherein adding the field to the packet comprises at least one of adding the field based on a number of bytes in the packet, adding the field to identify the packet as being from a new flow, and adding the field to identify a type of sampling that was used to sample the packet.

7. The method of claim 1, further comprising analyzing the packet that is sampled by summing the information from the field with corresponding fields of other packets that have been sampled.

8. The method of claim 1, wherein the packet is associated with a flow and the method further comprises determining whether to sample the packet without regard to an earlier decision to sample one or more flows.

9. The method of claim 1, further comprising maintaining a substantially constant use of resources to analyze sampled packets despite an increase in an amount of packets that are sampled.

10. A system for analyzing packets transmitted over a communications network comprising:
a computing device configured to determine whether to sample a packet from network traffic based on content of the packet and whether a number of sampled flows is less than a product of a number of total flows multiplied by a probability of sampling a flow, the computing device configured to sample the packet when the number of sampled flows is less than the product of the number of total flows multiplied by the probability of sampling a flow, the computing device configured to add a field to the packet in response to the packet being sampled, wherein the field includes information concerning the content of the packet.

11. The system of claim 10, wherein the computing device is configured to determine whether to sample the packet based on whether a number of sampled packets is less than a product of a number of total packets multiplied by a probability of sampling a packet and to sample the packet when the number of sampled packets is less than the product of a number of total packets multiplied by the probability of sampling a packet.

12. The system of claim 10, wherein the field added to the packet comprises at least one of adding the field based on a number of bytes in the packet, adding the field to identify the packet as being from a flow that has not been sampled, and adding the field to identify a type of sampling that was used to sample the packet.

13. The system of claim 10, wherein the computing device is configured to analyze the packet that is sampled by summing the information from the field with corresponding fields of other packets that have been sampled.

14. A method of analyzing packets transmitted over a communications network comprising:
determining whether to sample a packet from network traffic based on content of the packet and based on whether a number of sampled packets is less than a product of a number of total packets multiplied by a probability of sampling a packet;
sampling the packet when the number of sampled packets is less than the product of the number of total packets multiplied by the probability of sampling a packet; and
adding a field to the packet in response to the packet being sampled, the field including information concerning the content of the packet.

15. The method of claim 14, wherein determining whether to sample the packet comprises:
identifying a flow key for the packet;
determining whether the flow key is associated with a list of flows from which packets should be sampled; and
sampling the packet in response to the flow key being on the list.

16. The method of claim 14, wherein determining whether to sample the packet comprises:
identifying a flow key for the packet;
determining whether the flow key is associated with an actively sample flow; and
sampling the packet when the flow key is associated with an actively sampled flow.

17. The method of claim 14, further comprising:
generating a pseudo random number;
associating the pseudo random with the packet; and
determining whether to sample the packet based on a comparison between the pseudo random number and at least one of a probability of sampling a packet or a probability of sampling a flow.

18. The method of claim 14, wherein adding the field to the packet comprises at least one of adding the field based on a number of bytes in the packet, adding the field to identify the packet as being from a new flow, and adding the field to identify a type of sampling that was used to sample the packet.

19. The method of claim 14, further comprising analyzing the packet that is sampled by summing the information from the field with corresponding fields of other packets that have been sampled.

20. The method of claim 14, wherein the packet is associated with a flow and the method further comprises determining whether to sample the packet without regard to an earlier decision to sample one or more flows.

\* \* \* \* \*